(No Model.)

P. ARNOLD.
MACHINE FOR PREPARING CLAY.

No. 594,672. Patented Nov. 30, 1897.

WITNESSES
C. J. Gross.
Chas M Ball

INVENTOR
Phineas Arnold
By W K Miller
Attorney

UNITED STATES PATENT OFFICE.

PHINEAS ARNOLD, OF CANAL DOVER, OHIO.

MACHINE FOR PREPARING CLAY.

SPECIFICATION forming part of Letters Patent No. 594,672, dated November 30, 1897.

Application filed August 14, 1896. Serial No. 602,786. (No model.)

*To all whom it may concern:*

Be it known that I, PHINEAS ARNOLD, a citizen of the United States, and a resident of Canal Dover, county of Tuscarawas, State of Ohio, have invented a new and useful Improvement in Machines for Preparing Clay, of which the following is a full, clear, and exact description, reference being had to the accompanying drawings, making part of this specification.

My invention relates to certain improvements in machines for preparing clay, and especially to an improvement on Patent No. 475,915, bearing date May 31, 1892, for process of preparing clay.

The object is to provide means whereby a requisite amount of moisture may be provided and controlled at all times and the machine adapted to work equally well in hot or cold weather or to work hot or cold clay.

With these objects in view my invention relates to certain features of construction of parts, as will be hereinafter described and claimed.

Figure 1:
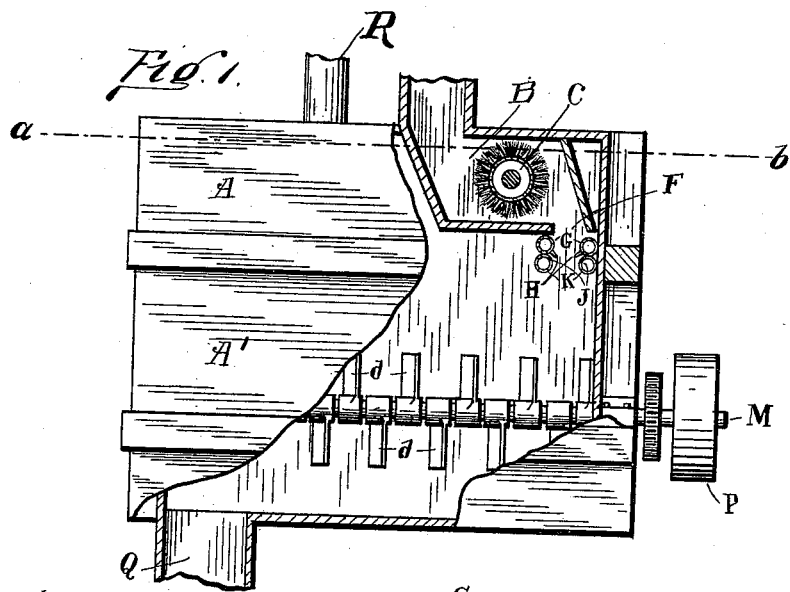
Figure 2:
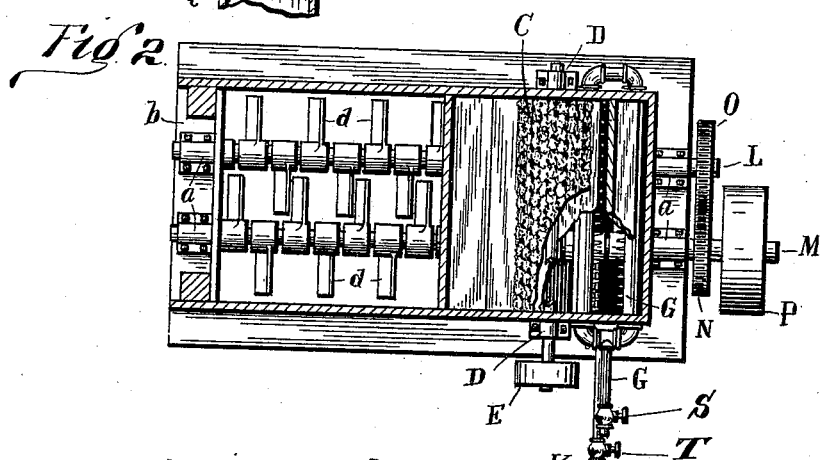
Figure 3:
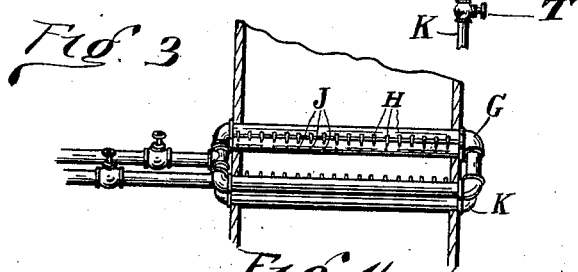
Figure 4:
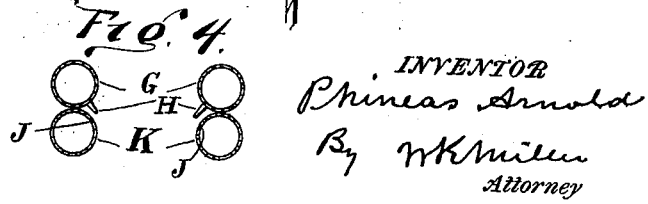

Figure 1 of the accompanying drawings is a side elevation, partly in section, of a machine illustrating my invention. Fig. 2 is a plan view from above, a portion of which is cut away to disclose the interior. Fig. 3 is a similar view showing the steam and water pipes with a fragment of the frame of the machine, and Fig. 4 is a transverse section through the steam and water pipes.

A denotes a receptacle for the clay which is rectangular in form on the top and at one end of which is provided an inlet or chute B, in which is provided a rotatable scattering-brush C, the supporting-shaft of which is journaled in boxes D, supported on the receptacle A. On one end of the brush-shaft is mounted a driving-pulley E.

An opening, as F, is provided in the bottom of the chute B, below which is placed a water-pipe G, of the form substantially as shown, or, in other words, that will conform to the form of opening in the chute. In the water-pipe is provided a series of small nozzles H, that register with a series of small apertures J in a steam-conducting pipe K, supported just below the water-pipe G, as shown in Figs. 3 and 4. The water is carried by the nozzles H, meets the jet of steam as it emerges from the perforations J, and is atomized thereby before contact with the clay as it falls through the aperture F in the bottom of the chute B and down between the pipes G and K into the receptacle A', where it will be deposited in an evenly-tempered homogeneous mass that may be made into bricks or other desirable articles, and when preferred rotatable shafts, as L and M, intergeared by gear-wheels N O and driven by a band-wheel P, are provided, supported in journal-boxes a, secured to cross-beams b. On said shafts are mounted blades d, respectively projecting in opposite directions and intermeshing to form a so-called pug-mill or mixer to mix and temper the clay. The arms or blades d also serve to convey the clay to the spout Q at the end of the receptacle opposite the spraying device.

When the pug or mixer is not desired, the ends of the receptacle with the pugging device may be removed and the opening closed with door-pieces, which may be opened when the clay is removed by hand with a shovel or other tool.

The upper end of chute B leads to a place of supply of finely-ground clay, and the spout Q to a place of deposit.

R denotes a vent-pipe leading to a place of deposit of particles of clay that may be carried with the escaping steam which may not have been arrested and detained by the deposit of clay in the receptacle.

The prime object of the provision of the water-jets, in conjunction with the steam-jets, is to condense the steam and atomize the water, as may be required, in hot weather, when the clay would be too warm to condense the steam to a degree necessary to cause it to become properly moistened to temper the clay and cause it to fall to the bottom of the receptacle, rendering it necessary to inject a quantity of water through the nozzles, that will be atomized by the jet of steam, forming a sufficient amount of spray to moisten the clay and cause it to fall to the bottom of the receptacle, as before stated. In very cold weather the clay may be of such temperature as to condense the steam and thus provide a necessary amount of moisture to evenly temper the falling clay, as before stated.

In operation the finely-ground clay is carried from a place of supply through a chute B, and is swept by the brush C in the form of a finely-disintegrated dust-like substance into the opening F and down between the water and steam pipes, at which point it is met by the atomized water, taking up a sufficient amount to cause it to fall to the bottom of the receptacle in a light homogeneous mass, where it may be allowed to remain a short time to further temper the mass, after which it may be removed by shovels to the press, and when desired or preferred the pugging device herein shown and described may be placed in the bottom portion of the receptacle to mix and discharge the tempered clay, as hereinbefore described. The quantity of water or steam may be regulated by the valves opening or closing the valves S T in the pipes G and K.

Having thus fully described the nature and object of my invention, what I claim is—

1. The combination in a clay-working machine, of a chute provided with a scattering feed-brush, with a water-conducting pipe having parallel branches provided with nozzles, and a steam-conducting pipe composed of like parallel branches, and provided with nozzles, both the water and steam pipes located below the chute and having supply-pipes attached thereto, provided with suitable cut-offs, substantially as and for the purpose set forth.

2. In a machine for treating clay, the combination with the clay-receptacle, of a conductor-chute having located therein a rotatable brush, parallel independent steam and water pipes located below the chute, and having suitable openings therein, and supply-pipes connected thereto and provided with cut-off valves, whereby either the steam or water or both may be used, substantially as and for the purpose set forth.

3. The combination in a clay-working machine, of a conductor-chute terminating in a clay-receptacle, with independent water and steam conducting pipes located below the chute, having parallel branches provided with nozzles and suitable cut-off valves, substantially as and for the purpose set forth.

4. In a machine for treating clay, the combination with the clay-receptacle, of a conductor-chute, independent parallel steam and water pipes located below the chute, and having suitable openings therein, and provided with cut-off valves whereby either the steam or water or both may be used, substantially as and for the purpose set forth.

In testimony whereof I have hereunto set my hand this 4th day of August, A. D. 1896.

PHINEAS ARNOLD.

Witnesses:
W. K. MILLER,
CHAS. M. BALL.